US012187273B2

(12) United States Patent
Kobayashi

(10) Patent No.: US 12,187,273 B2
(45) Date of Patent: Jan. 7, 2025

(54) VEHICLE DRIVE ASSIST DEVICE, VEHICLE DRIVE ASSIST METHOD, AND NON-TRANSITORY STORAGE MEDIUM

(71) Applicant: TOYOTA JIDOSHA KABUSHIKI KAISHA, Toyota (JP)

(72) Inventor: Makoto Kobayashi, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 17/860,349

(22) Filed: Jul. 8, 2022

(65) Prior Publication Data
US 2023/0066459 A1 Mar. 2, 2023

(30) Foreign Application Priority Data

Aug. 30, 2021 (JP) ................................ 2021-139773

(51) Int. Cl.
*B60W 30/095* (2012.01)
*B60W 50/14* (2020.01)

(52) U.S. Cl.
CPC .......... *B60W 30/095* (2013.01); *B60W 50/14* (2013.01); *B60W 2050/146* (2013.01); *B60W 2510/18* (2013.01); *B60W 2554/4049* (2020.02)

(58) Field of Classification Search
CPC ............... B60W 30/095; B60W 50/14; B60W 2050/146; B60W 2510/18; B60W 2554/4049; B60W 2050/143; B60W 2540/10; B60W 2540/12; B60W 2540/16; B60W 2540/18; B60W 2540/229; B60W 30/16; B60W 30/0953; B60W 30/08; B60W 10/10; B60W 10/18; B60W 30/181; B60W 30/18163; B60W 40/105; B60W 2050/0002; B60W 2520/04; B60W 2554/40; B60W 2720/10
See application file for complete search history.

(56) References Cited

U.S. PATENT DOCUMENTS

2009/0128318 A1 5/2009 Nagata et al.
2013/0211687 A1 8/2013 Trost et al.
(Continued)

FOREIGN PATENT DOCUMENTS

JP 2005-031967 A 2/2005
JP 2008-001304 A 1/2008
(Continued)

*Primary Examiner* — Ashley L Redhead, Jr.
(74) *Attorney, Agent, or Firm* — Dinsmore & Shohl LLP

(57) ABSTRACT

A vehicle drive assist device includes an ECU. The ECU determines whether an object recognition condition meets a predetermined condition, which means that a driver of the vehicle recognizes the presence of an object ahead of the vehicle, based on the state of an operation of an operator of the vehicle by the driver. The ECU executes deceleration control when the collision index value is smaller than a second index value smaller than a first index value and the ECU determines the object recognition condition does not meet the predetermined condition. The ECU does not execute the deceleration control when the ECU determines the object recognition condition meets the predetermined condition even when the collision index value is smaller than the second index value.

8 Claims, 10 Drawing Sheets

(56) References Cited

U.S. PATENT DOCUMENTS

| | | | |
|---|---|---|---|
| 2014/0142798 A1* | 5/2014 | Guarnizo Martinez | ..................... B60W 10/18 701/23 |
| 2016/0016560 A1* | 1/2016 | Parker | ..................... B60T 8/171 701/70 |
| 2017/0368936 A1* | 12/2017 | Kojima | ................. B60W 40/09 |
| 2019/0204827 A1* | 7/2019 | Bhalla | ............... B60W 60/0051 |
| 2019/0225197 A1* | 7/2019 | Gomes | ................. B60T 13/662 |
| 2020/0001839 A1 | 1/2020 | Lee | |
| 2020/0108805 A1* | 4/2020 | Woo | ....................... G01S 13/867 |
| 2020/0189612 A1* | 6/2020 | Shimizu | ............... G05D 1/0061 |
| 2020/0391591 A1* | 12/2020 | Kim | ..................... B60W 30/09 |
| 2021/0150895 A1* | 5/2021 | Huang | .................. G06V 20/56 |
| 2021/0155232 A1 | 5/2021 | Ike | |
| 2022/0068052 A1* | 3/2022 | Maeta | ................. G07C 5/0808 |
| 2022/0410882 A1* | 12/2022 | Bush | ................... G08G 1/09626 |
| 2024/0042996 A1* | 2/2024 | Park | ..................... B60W 50/14 |

FOREIGN PATENT DOCUMENTS

| | | | |
|---|---|---|---|
| JP | 2012-121534 A | | 6/2012 |
| JP | 2013-540070 A | | 10/2013 |
| JP | 2021-079904 A | | 5/2021 |
| KR | 101986824 B1 | | 6/2019 |
| WO | 2005/005206 A1 | | 1/2005 |
| WO | 2008/001874 A1 | | 1/2008 |

* cited by examiner

FIG. 3A
FIG. 3B
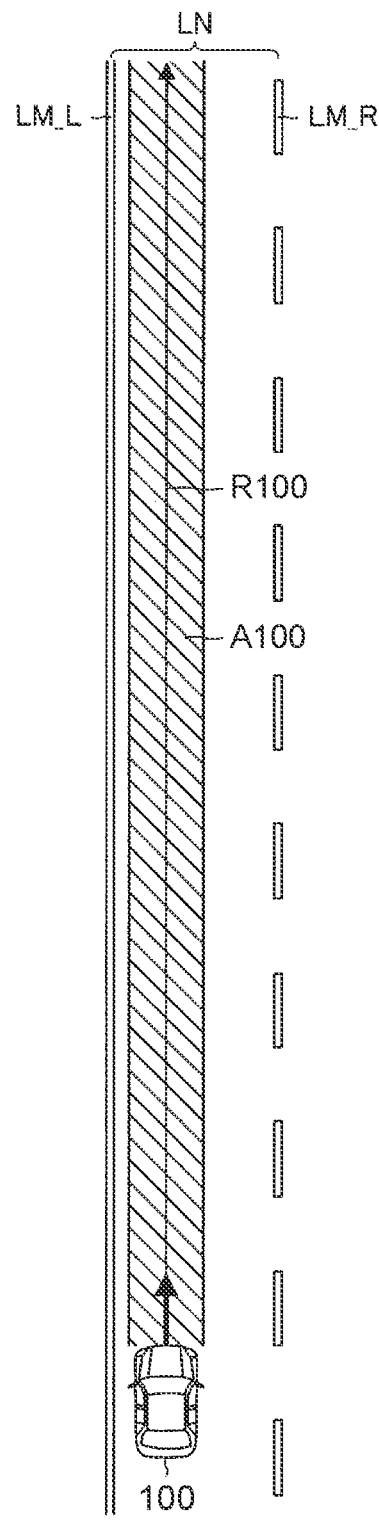
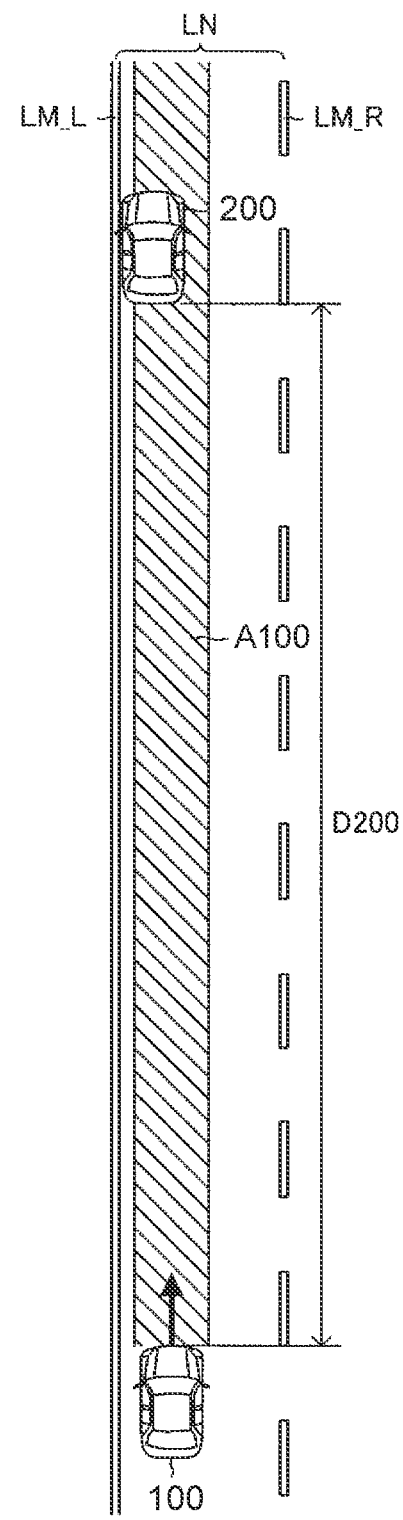

VEHICLE DRIVE ASSIST DEVICE, VEHICLE DRIVE ASSIST METHOD, AND NON-TRANSITORY STORAGE MEDIUM

CROSS-REFERENCE TO RELATED APPLICATION

This application claims priority to Japanese Patent Application No. 2021-139773 filed on Aug. 30, 2021, incorporated herein by reference in its entirety.

BACKGROUND

1. Technical Field

The present disclosure relates to a vehicle drive assist device, a vehicle drive assist method, and a non-transitory storage medium.

2. Description of Related Art

There is known a vehicle drive assist device that executes warning control for warning a driver of a host vehicle and deceleration control for decelerating the host vehicle as collision avoidance control for avoiding a collision of the host vehicle against an object ahead of the host vehicle. There is also known, as such a vehicle drive assist device, a vehicle drive assist device that uses whether a driver is looking off as a condition for determining whether to execute deceleration control (see Japanese Unexamined Patent Application Publication No. 2008-1304 (JP 2008-1304 A), for example).

SUMMARY

As discussed above, the condition for determining whether to execute deceleration control is a condition for appropriately determining whether it is necessary to execute deceleration control. When whether the driver is looking off is used as such a condition, however, it is necessary to mount a camera (so-called driver monitor camera) that captures the face of the driver, for example, on the host vehicle in order to determine whether the driver is looking aside. When such a camera is mounted on the host vehicle, however, the cost is accordingly increased, which is not favorable.

The present disclosure provides a vehicle drive assist device, a vehicle drive assist method, and a non-transitory storage medium.

A first aspect of the present disclosure provides a vehicle drive assist device including an electronic control unit (ECU) configured as follows. The ECU sets a collision index value that indicates a possibility that a host vehicle collides against an object ahead of the host vehicle. The collision index value becomes smaller as the possibility that the host vehicle collides against the object becomes higher. The ECU determines whether an object recognition condition meets a predetermined condition based on a state of an operation of an operator of the host vehicle by a driver of the host vehicle, the predetermined condition meaning that the driver recognizes presence of the object. The ECU executes warning control when the collision index value has become as small as a first index value. The ECU executes deceleration control when the collision index value is smaller than a second index value that is smaller than the first index value and the ECU determines that the object recognition condition does not meet the predetermined condition. On the other hand, the ECU does not execute the deceleration control when the ECU determines that the object recognition condition meets the predetermined condition even when the collision index value is smaller than the second index value.

In some embodiments, a further warning such as the deceleration control is provided to the driver when the driver is not reminded of an object (forward object) ahead of the host vehicle and, thus, the driver does not recognize the presence of the forward object even when a warning is provided to the driver when there is a possibility that the host vehicle collides against the forward object. In this case, it is conceivable to provide the host vehicle with a camera that captures the face of the driver, for example, as a unit that determines whether the driver recognizes the presence of the forward object and use an image of the driver captured by the camera. With such a configuration, however, the cost is increased since such a camera is mounted on the host vehicle, which is unfavorable.

When a warning is issued and the driver recognizes the presence of the forward object based on the warning, on the other hand, the driver should attempt to avoid a collision between the forward object and the host vehicle. If the driver attempts to avoid a collision between the forward object and the host vehicle, the driver should operate an operator of the host vehicle or stop an operation of an operator. Thus, it can be determined whether the driver recognizes the presence of the forward object based on the operation state of an operator of the host vehicle after a warning is started.

The ECU provided in the vehicle drive assist device according to the first aspect of the present disclosure determines whether the driver recognizes the presence of the forward object (i.e. whether the object recognition condition meets the predetermined condition) based on the state of an operation of an operator of the host vehicle by the driver. The ECU executes the deceleration control when it is determined that the object recognition condition does not meet the predetermined condition when the collision index value has become as small as the second index value, and does not execute the deceleration control when it is determined that the object recognition condition meets the predetermined condition even when the collision index value has become as small as the second index value. Thus, with the ECU provided in the vehicle drive assist device according to the first aspect of the present disclosure, it is possible to appropriately determine whether it is necessary to execute the deceleration control without requiring a camera that captures the face of the driver.

The ECU may be configured to determine whether the object recognition condition meets the predetermined condition based on a state of an operation of an accelerator operator of the host vehicle and a state of an operation of a brake operator of the host vehicle.

When a warning is issued and the driver recognizes the presence of the forward object based on the warning and attempts to avoid a collision between the forward object and the host vehicle, it is considered that the driver changes his/her operations of the accelerator operator and the brake operator of the host vehicle. Thus, it can be determined whether the driver recognizes the presence of the forward object based on the operation states of the accelerator operator and the brake operator after a warning is started.

The ECU provided in the vehicle drive assist device according to the first aspect of the present disclosure may determine whether the driver recognizes the presence of the forward object (i.e. whether the object recognition condition meets the predetermined condition) based on the operation states of the accelerator operator and the brake operator. Thus, the vehicle drive assist device according to the present disclosure can appropriately determine whether it is necessary to execute the deceleration control without requiring a camera that captures the face of the driver.

The ECU may be configured to determine that the object recognition condition does not meet the predetermined condition when the brake operator is not operated and the accelerator operator is operated.

When a warning is issued and the driver recognizes the presence of the forward object based on the warning and attempts to avoid a collision between the forward object and the host vehicle, it is considered that the driver stops an operation of the accelerator operator of the host vehicle and operates the brake operator. Thus, there is a possibility that the driver does not recognize the presence of the forward object when the driver is not operating the brake operator but is operating the accelerator operator.

The ECU provided in the vehicle drive assist device according to the first aspect of the present disclosure may determine that the driver does not recognize the presence of the forward object, that is, the object recognition condition does not meet the predetermined condition, when the brake operator is not operated and the accelerator operator is operated. Thus, the vehicle drive assist device according to the present disclosure can appropriately determine whether it is necessary to execute the deceleration control without requiring a camera that captures the face of the driver.

The ECU may be configured to determine that the object recognition condition does not meet the predetermined condition when the brake operator is not operated when the accelerator operator is not operated continuously for a predetermined time.

When a warning is issued and the driver recognizes the presence of the forward object based on the warning and attempts to avoid a collision between the forward object and the host vehicle, it is considered that the driver attempts to decelerate the host vehicle by stopping an operation of the accelerator operator of the host vehicle and thereafter operating the brake operator. Thus, there is a possibility that the driver does not recognize the presence of the forward object when the driver does not operate the brake operator even when a certain time elapses after the driver stops an operation of the accelerator operator.

The ECU provided in the vehicle drive assist device according to the first aspect of the present disclosure may determine that the driver does not recognize the presence of the forward object, that is, the object recognition condition does not meet the predetermined condition, when the brake operator is not operated when the accelerator operator is not operated continuously for a predetermined time. Thus, the vehicle drive assist device according to the present disclosure can appropriately determine whether it is necessary to execute the deceleration control without requiring a camera that captures the face of the driver.

The ECU may be configured to determine that the object recognition condition meets the predetermined condition when an operator of the host vehicle is operated to increase a gear ratio of the host vehicle; and determine that the object recognition condition does not meet the predetermined condition when the operator of the host vehicle is not operated to increase the gear ratio of the host vehicle.

When a warning is issued and the driver recognizes the presence of the forward object based on the warning and attempts to avoid a collision between the forward object and the host vehicle, it is considered that the driver attempts to decelerate the host vehicle by increasing the gear ratio of the host vehicle. Thus, there is a possibility that the driver does not recognize the presence of the forward object when the driver does not operate the operator of the host vehicle to increase the gear ratio of the host vehicle.

The ECU provided in the vehicle drive assist device according to the first aspect of the present disclosure may determine that the driver recognizes the presence of the forward object, that is, that the object recognition condition meets the predetermined condition, when the operator of the host vehicle is operated to increase the gear ratio of the host vehicle, and determine that the driver does not recognize the presence of the forward object, that is, that the object recognition condition does not meet the predetermined condition, when the operator of the host vehicle is not operated to increase the gear ratio of the host vehicle. Thus, the vehicle drive assist device according to the present disclosure can appropriately determine whether it is necessary to execute the deceleration control without requiring a camera that captures the face of the driver.

The ECU may be configured to determine that the object recognition condition meets the predetermined condition when an operator of the host vehicle is operated to change a course of the host vehicle; and determine that the object recognition condition does not meet the predetermined condition when the operator of the host vehicle is not operated to change the course of the host vehicle.

When a warning is issued and the driver recognizes the presence of the forward object based on the warning and attempts to avoid a collision between the forward object and the host vehicle, it is considered that the driver attempts to avoid a collision between the host vehicle and the forward object by changing the course of the host vehicle. Thus, there is a possibility that the driver does not recognize the presence of the forward object when the driver does not operate the operator of the host vehicle to change the course of the host vehicle.

The ECU provided in the vehicle drive assist device according to the first aspect of the present disclosure may determine that the driver recognizes the presence of the forward object, that is, the object recognition condition meets the predetermined condition, when an operator of the host vehicle is operated to change the course of the host vehicle, and determine that the driver does not recognize the presence of the forward object, that is, the object recognition condition does not meet the predetermined condition, when the operator of the host vehicle is not operated to change the course of the host vehicle. Thus, the vehicle drive assist device according to the present disclosure can appropriately determine whether it is necessary to execute the deceleration control without requiring a camera that captures the face of the driver.

The ECU may be configured to execute stop control for stopping the host vehicle when the collision index value has become as small as a third index value that is smaller than the second index value after the deceleration control is started.

In some embodiments, when the host vehicle approaches the forward object, the host vehicle may be forcibly stopped in order to avoid a collision between the forward object and the host vehicle.

The ECU provided in the vehicle drive assist device according to the first aspect of the present disclosure may stop the host vehicle by executing the stop control when the collision index value has become as small as the third index value after the deceleration control is started. Thus, the vehicle drive assist device according to the present disclosure can reliably avoid a collision between the host vehicle and the forward object.

A second aspect of the present disclosure provides a non-transitory storage medium storing instructions that are executable by one or more electronic control units (ECUs) and that cause the one or more ECUs to execute following functions. A collision index value is set that becomes smaller as a possibility that a host vehicle collides against an object ahead of the host vehicle becomes higher. Moreover, it is determined whether an object recognition condition meets a predetermined condition based on a state of an operation of an operator of the host vehicle by a driver of the host vehicle. The predetermined condition means that the driver recognizes presence of the object. It is executed that warning control for warning the driver when the collision index value is smaller than a first index value. It is executed that deceleration control for decelerating the host vehicle when the collision index value is smaller than a second index value that is smaller than the first index value and it is determined that the object recognition condition does not meet the predetermined condition. It is disabled that an execution of the deceleration control when the collision index value is smaller than the second index value and it is determined that the object recognition condition meets the predetermined condition.

With the non-transitory storage medium according to the second aspect of the present disclosure, it is possible to appropriately determine whether it is necessary to execute the deceleration control without requiring a camera that captures the face of the driver for the same reason as the reason discussed earlier.

In the non-transitory storage medium, it may be determined whether the object recognition condition meets the predetermined condition based on a state of an operation of an accelerator operator of the host vehicle and a state of an operation of a brake operator of the host vehicle.

With the non-transitory storage medium according to the second aspect of the present disclosure, it is possible to appropriately determine whether it is necessary to execute the deceleration control without requiring a camera that captures the face of the driver for the same reason as the reason discussed earlier.

In the non-transitory storage medium, it may be determined that the object recognition condition does not meet the predetermined condition t when the brake operator is not operated and the accelerator operator is operated.

With the non-transitory storage medium according to the second aspect of the present disclosure, it is possible to appropriately determine whether it is necessary to execute the deceleration control without requiring a camera that captures the face of the driver for the same reason as the reason discussed earlier.

In the non-transitory storage medium, it may be determined that the object recognition condition does not meet the predetermined condition when the brake operator is not operated when the accelerator operator is not operated continuously for a predetermined time.

With the non-transitory storage medium according to the second aspect of the present disclosure, it is possible to appropriately determine whether it is necessary to execute the deceleration control without requiring a camera that captures the face of the driver for the same reason as the reason discussed earlier.

A third aspect of the present disclosure provides a vehicle drive assist method including: setting a collision index value that becomes smaller as a possibility that a host vehicle collides against an object ahead of the host vehicle becomes higher; determining whether an object recognition condition meets a predetermined condition based on a state of an operation of an operator of the host vehicle by a driver of the host vehicle, the predetermined condition meaning that the driver recognizes presence of the object; executing warning control for warning the driver when the collision index value is smaller than a first index value; executing deceleration control for decelerating the host vehicle when the collision index value is smaller than a second index value that is smaller than the first index value and it is determined that the object recognition condition does not meet the predetermined condition; and disabling execution of the deceleration control when the collision index value is smaller than the second index value and it is determined that the object recognition condition meets the predetermined condition.

With the vehicle drive assist method according to the third aspect of the present disclosure, it is possible to appropriately determine whether it is necessary to execute the deceleration control without requiring a camera that captures the face of the driver for the same reason as the reason discussed earlier.

The constituent elements according to the present disclosure are not limited to those according to an embodiment of the present disclosure to be discussed later with reference to the drawings. Other objects, other features, and accompanying advantages of the present disclosure will be easily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A illustrates a predicted travel region of the host vehicle;

FIG. 3B illustrates a scene in which an object (vehicle) is present in the predicted travel region of the host vehicle;

DETAILED DESCRIPTION OF EMBODIMENTS

Figure 1:
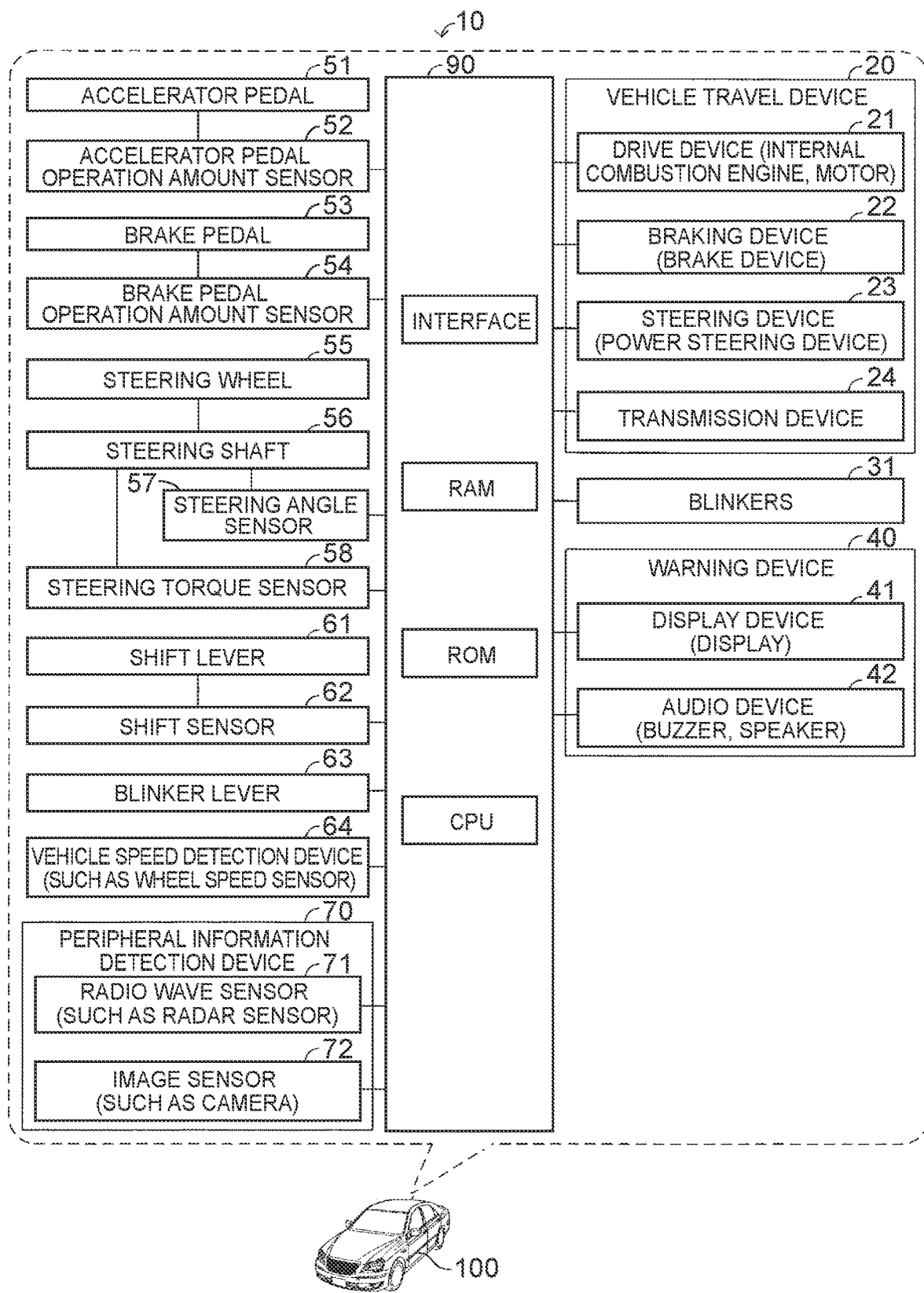
FIG. 1 illustrates a vehicle drive assist device according to an embodiment of the present disclosure and a vehicle (host vehicle) on which the vehicle drive assist device is mounted.

A vehicle drive assist device according to an embodiment of the present disclosure will be described below with reference to the drawings. As illustrated in FIG. 1, a vehicle drive assist device 10 according to the embodiment of the present disclosure is mounted on a host vehicle 100. In the following description, a driver of the host vehicle 100 will be referred to as a "driver DR". ECU The vehicle drive assist device 10 includes an electronic control unit (ECU) 90. The ECU 90 includes a microcomputer as a main component. The microcomputer includes a central processing unit (CPU), a non-transitory storage medium such as a read only memory (ROM), a random access memory (RAM), a non-volatile memory, an interface, etc. The CPU executes instructions, programs, or routines stored in the ROM to implement various functions.
Vehicle Travel Device A vehicle travel device 20 is mounted on the host vehicle 100. The vehicle travel device 20 includes a drive device 21, a braking device 22, a steering device 23, and a transmission device 24.
Drive Device The drive device 21 is a device that outputs drive torque (drive force) to be applied to the host vehicle 100 in order to cause the host vehicle 100 to travel, and may be an internal combustion engine, a motor, etc., for example. The drive device 21 is electrically connected to the ECU 90. The ECU 90 can control the drive torque output from the drive device 21 by controlling operation of the drive device 21.
Braking Device The braking device 22 is a device that outputs braking torque (braking force) to be applied to the host vehicle 100 in order to brake the host vehicle 100, and may be a brake device, for example. The braking device 22 is electrically connected to the ECU 90. The ECU 90 can control the braking torque output from the braking device 22 by controlling operation of the braking device 22.
Steering Device The steering device 23 is a device that outputs steering torque (steering force) to be applied to the host vehicle 100 in order to steer the host vehicle 100, and may be a power steering device, for example. The steering device 23 is electrically connected to the ECU 90. The ECU 90 can control the steering torque output from the steering device 23 by controlling operation of the steering device 23.
Transmission Device The transmission device 24 is a device that switches whether to transmit the drive force output from the drive device 21 to drive wheels of the host vehicle 100, or that switches whether to transmit the drive force to the drive wheels so as to move the host vehicle 100 forward or to transmit the drive force to the drive wheels so as to move the host vehicle 100 backward. The transmission device 24 is also a device that changes the gear ratio of the host vehicle 100. More specifically, the transmission device 24 is also a device that outputs rotation input from the drive device 21 to the transmission device 24 with the speed of the rotation varied. The transmission device 24 is also a device that keeps the host vehicle 100 stationary by locking gears of the transmission device 24 so as not to be rotated by engaging a pawl-like component (parking lock pawl) with such gears.

The transmission device 24 operates in one of a state (D-range state) in which the drive force is transferred to the drive wheels so as to move the host vehicle 100 forward with a relatively low gear ratio, a state (B-range state) in which the drive force is transferred to the drive wheels so as to move the host vehicle 100 forward with a relatively high gear ratio, a state (R-range state) in which the drive force is transferred to the drive wheels so as to move the host vehicle 100 backward, a state (N-range state) in which the drive force is not transferred to the drive wheels of the host vehicle 100, and a state (P-range state) in which the host vehicle 100 is kept stationary.

The transmission device 24 is electrically connected to the ECU 90. The ECU 90 can set the transmission device 24 to one of the D-range state, the R-range state, the N-range state, and the P-range state by controlling operation of the transmission device 24.
Blinkers Blinkers 31 are mounted on the host vehicle 100. The blinkers 31 are provided at the right front corner portion, the left front corner portion, the right rear corner portion, and the left rear corner portion of the host vehicle 100. The blinkers 31 are electrically connected to the ECU 90. The blinkers 31 flash on and off in accordance with various instruction signals transmitted from the ECU 90.
Warning Device A warning device 40 is mounted on the host vehicle 100. The warning device 40 is a device that provides various warnings to the driver DR, and includes a display device 41 and an audio device 42 in the present example.
Display Device The display device 41 is a device that displays various images, and may be a display provided in a so-called combination meter, a head-up display, a display of a car navigation device, etc., for example. The display device 41 is electrically connected to the ECU 90. The ECU 90 can cause the display device 41 to display various images.
Audio Device The audio device 42 is a device that outputs various notification sounds, warning sounds, notification voices, and warning voices, and may be a buzzer or a speaker, for example. The audio device 42 is electrically connected to the ECU 90. The ECU 90 can cause the audio device 42 to output various notification sounds, warning sounds, notification voices, and warning voices.
Sensors, Etc.

An accelerator pedal 51 (accelerator operator), an accelerator pedal operation amount sensor 52, a brake pedal 53 (brake operator), a brake pedal operation amount sensor 54, a steering wheel 55 (course change operator), a steering shaft 56, a steering angle sensor 57, a steering torque sensor 58, a shift lever 61 (shifting operator), a shift sensor 62, a blinker lever 63 (course change operator), a vehicle speed detection device 64, and a peripheral information detection device 70 are mounted on the host vehicle 100.
Accelerator Pedal Operation Amount Sensor The accelerator pedal operation amount sensor 52 is a sensor that detects the operation amount of the accelerator pedal 51, and is electrically connected to the ECU 90. The accelerator pedal operation amount sensor 52 transmits information on the detected operation amount of the accelerator pedal 51 to the ECU 90. The ECU 90 acquires the operation amount of the accelerator pedal 51 based on the information as an accelerator pedal operation amount AP. The ECU 90 acquires required drive torque (required drive force) through computation based on the accelerator pedal operation amount AP and a vehicle speed V100 of the host vehicle 100. The required drive torque is drive torque that the drive device 21 is required to output. The ECU 90 controls operation of the drive device 21 such that the required drive torque is output. When deceleration control or stop control to be discussed later is executed, the ECU 90 determines the required drive torque as appropriate, irrespective of the accelerator pedal operation amount AP, and controls operation of the drive device 21 such that the required drive torque is output.

Brake Pedal Operation Amount Sensor

The brake pedal operation amount sensor 54 is a sensor that detects the operation amount of the brake pedal 53, and is electrically connected to the ECU 90. The brake pedal operation amount sensor 54 transmits information on the detected operation amount of the brake pedal 53 to the ECU 90. The ECU 90 acquires the operation amount of the brake pedal 53 based on the information as a brake pedal operation amount BP. The ECU 90 acquires required braking torque (required braking force) through computation based on the brake pedal operation amount BP. The required braking torque is braking torque that the braking device 22 is required to output. The ECU 90 controls operation of the braking device 22 such that the required braking torque is output. When deceleration control or stop control to be discussed later is executed, the ECU 90 determines the required braking torque as appropriate, irrespective of the brake pedal operation amount BP, and controls operation of the braking device 22 such that the required braking torque is output.

Steering Angle Sensor

The steering angle sensor 57 is a sensor that detects the rotational angle of the steering shaft 56 with respect to the neutral position, and is electrically connected to the ECU 90. The steering angle sensor 57 transmits information on the detected rotational angle of the steering shaft 56 to the ECU 90. The ECU 90 acquires the rotational angle of the steering shaft 56 as a steering angle θ based on the information.

Steering Torque Sensor

The steering torque sensor 58 is a sensor that detects torque input to the steering shaft 56 by the driver DR via the steering wheel 55, and is electrically connected to the ECU 90. The steering torque sensor 58 transmits information on the detected torque to the ECU 90. The ECU 90 acquires the torque (driver input torque) input to the steering shaft 56 by the driver DR via the steering wheel 55 based on the information.

Shift Sensor

The shift sensor 62 is a sensor that detects the set position of the shift lever 61. The shift lever 61 is a device to be operated by the driver DR. The set positions of the shift lever 61 that can be set by the driver DR include a high-speed forward position (D range), a low-speed forward position (B range), a reverse position (R range), a neutral range (N range), and a parking range (P range). The shift sensor 62 is electrically connected to the ECU 90. The shift sensor 62 transmits a signal that indicates the detected set position of the shift lever 61 to the ECU 90.

When the shift lever 61 is set to the D range, the shift sensor 62 transmits a signal that indicates so to the ECU 90. When the signal is received, the ECU 90 controls operation of the transmission device 24 such that the transmission device 24 is brought into the D-range state. When the shift lever 61 is set to the B range, the shift sensor 62 transmits a signal that indicates so to the ECU 90. When the signal is received, the ECU 90 controls operation of the transmission device 24 such that the transmission device 24 is brought into the B-range state.

When the shift lever 61 is set to the R range, the shift sensor 62 transmits a signal that indicates so to the ECU 90. When the signal is received, the ECU 90 controls operation of the transmission device 24 such that the transmission device 24 is brought into the R-range state. When the shift lever 61 is set to the N range, the shift sensor 62 transmits a signal that indicates so to the ECU 90. When the signal is received, the ECU 90 controls operation of the transmission device 24 such that the transmission device 24 is brought into the N-range state. When the shift lever 61 is set to the P range, the shift sensor 62 transmits a signal that indicates so to the ECU 90. When the signal is received, the ECU 90 controls operation of the transmission device 24 such that the transmission device 24 is brought into the P-range state.

Blinker Lever

The blinker lever 63 is a lever to be operated by the driver DR. When the driver DR operates the blinker lever 63 counterclockwise, the blinker lever 63 transmits a signal indicating that the driver DR has operated the blinker lever 63 counterclockwise to the ECU 90. When the signal is received, the ECU 90 flashes on and off each of the blinkers 31 provided at the left front corner portion and the left rear corner portion. When the driver DR operates the blinker lever 63 clockwise, on the other hand, the blinker lever 63 transmits a signal indicating that the driver DR has operated the blinker lever 63 clockwise to the ECU 90. When the signal is received, the ECU 90 flashes on and off each of the blinkers 31 provided at the right front corner portion and the right rear corner portion.

Vehicle Speed Detection Device

The vehicle speed detection device 64 is a device that detects the vehicle speed of the host vehicle 100, and may be a wheel speed sensor, for example. The vehicle speed detection device 64 is electrically connected to the ECU 90. The vehicle speed detection device 64 transmits information on the detected vehicle speed of the host vehicle 100 to the ECU 90. The ECU 90 acquires the vehicle speed V100 of the host vehicle 100 based on the information.

The ECU 90 acquires required steering torque through computation based on the steering angle θ, the driver input torque, and the vehicle speed V100. The required steering torque is steering torque that the steering device 23 is required to output. The ECU 90 controls operation of the steering device 23 such that the required steering torque is output from the steering device 23. When steering avoidance control to be discussed later is executed, the ECU 90 determines steering torque that is necessary to cause the host vehicle 100 to travel along a target avoidance path R_TGT as the required steering torque, irrespective of the steering angle θ etc., and controls operation of the steering device 23 such that the required steering torque is output.

Peripheral Information Detection Device

The peripheral information detection device 70 is a device that detects information on the area around the host vehicle 100, and includes a radio wave sensor 71 and an image sensor 72 in the present example. The radio wave sensor 71 may be a radar sensor (such as a millimeter wave radar), for example. The image sensor 72 may be a camera, for example. The peripheral information detection device 70 may include an acoustic wave sensor such as an ultrasonic wave sensor (clearance sonar) and an optical sensor such as a laser radar (LiDAR).

Radio Wave Sensor

The radio wave sensor 71 is electrically connected to the ECU 90. The radio wave sensor 71 emits radio waves, and receives radio waves (reflected waves) reflected by an object. The radio wave sensor 71 transmits information (detection results) about the emitted radio waves and the received radio waves (reflected waves) to the ECU 90. In other words, the radio wave sensor 71 detects an object that is present around the host vehicle 100, and transmits information (detection results) about the detected object to the ECU 90. The ECU 90 can acquire information (peripheral detection information INF_S) about the object that is present around the host vehicle 100 based on the information (radio-wave information). In the present example, the object may be a vehicle, a motorcycle, a bicycle, a person, etc.

Image Sensor

The image sensor 72 is also electrically connected to the ECU 90. The image sensor 72 captures an image of the area around the host vehicle 100, and transmits information about the captured image to the ECU 90. The ECU 90 can acquire information (peripheral detection information INF_S) about the area around the host vehicle 100 based on the information (image information).

Figure 2:
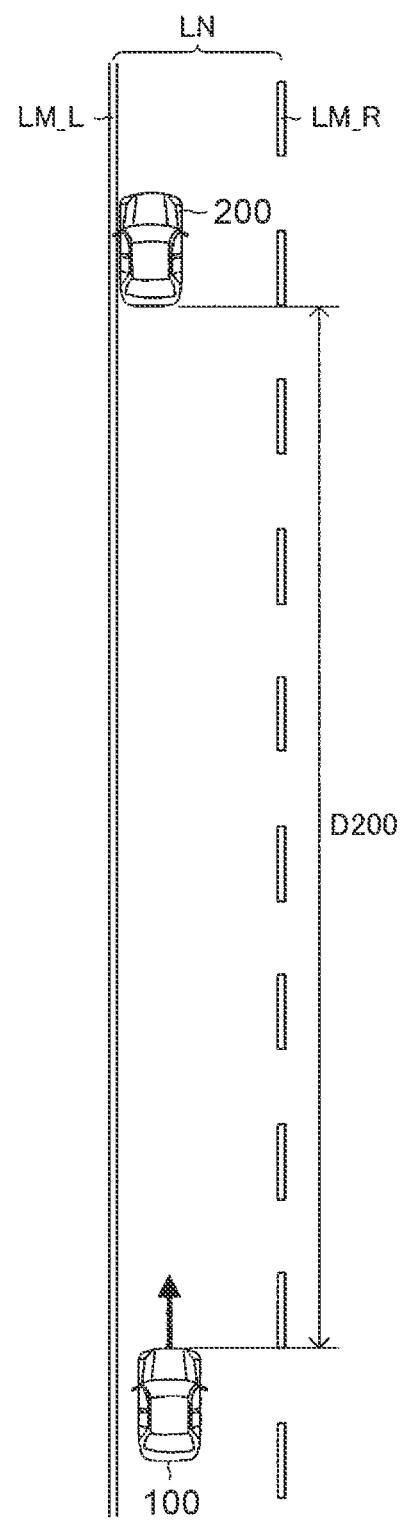
FIG. 2 illustrates the distance between the host vehicle and an object (vehicle) ahead of the host vehicle etc.

When an object (forward object 200) is present ahead of the host vehicle 100 as illustrated in FIG. 2, the ECU 90 detects the forward object 200 based on the peripheral detection information INF_S. The forward object 200 may be a vehicle, a motorcycle, a bicycle, a person, etc., and is a vehicle in the example illustrated in FIG. 2.

When the forward object 200 is detected, the ECU 90 can acquire a "distance (object distance D200) between the forward object 200 and the host vehicle 100", a "speed (relative speed ΔV200) of the host vehicle 100 relative to the forward object 200", etc. based on the peripheral detection information INF_S.

The ECU 90 further recognizes a right marking line LM_R and a left marking line LM_L that prescribe the travel lane (host vehicle lane LN) for the host vehicle 100" based on the peripheral detection information INF_S. The ECU 90 can specify the range of the host vehicle lane LN based on the recognized right and left marking lines LM (i.e. the right marking line LM_R and the left marking line LM_L).

Overview of Operation of Vehicle Drive Assist Device

Next, an overview of operation of the vehicle drive assist device 10 will be described.

The vehicle drive assist device 10 executes warning control for warning the driver DR, deceleration control for decelerating the host vehicle 100, and stop control for stopping the host vehicle 100, as collision avoidance control for avoiding a collision of the host vehicle 100 against an object ahead of the host vehicle 100, in accordance with whether various conditions are met.

The vehicle drive assist device 10 performs a process for detecting an object, such as a vehicle, ahead of the host vehicle 100 in the travel direction based on the peripheral detection information INF_S during travel of the host vehicle 100. The vehicle drive assist device 10 executes normal travel control while an object ahead of the host vehicle 100 in the travel direction is not detected.

In the normal travel control, operation of the drive device 21 is controlled such that the required drive torque (required drive force) is output from the drive device 21 when the required drive torque is more than zero, operation of the braking device 22 is controlled such that the required braking torque (required braking force) is output from the braking device 22 when the required braking torque is more than zero, and operation of the steering device 23 is controlled such that the required steering torque (required steering force) is output from the steering device 23 when the required steering torque is more than zero.

When an object (forward object 200) ahead of the host vehicle 100 in the travel direction is detected, the vehicle drive assist device 10 determines based on the peripheral detection information INF_S whether the object is present within a predicted travel region A100. As illustrated in FIG. 3A, the predicted travel region A100 is a region centered on a predicted travel route R100 of the host vehicle 100 and having a width that is equivalent to the width of the host vehicle 100. The predicted travel route R100 is a travel route that the host vehicle 100 is predicted to travel along from now on when the host vehicle 100 travels while maintaining the steering angle θ at that time. Thus, while the predicted travel route R100 indicated in FIG. 3A is straight, the predicted travel route R100 may be curved, depending on the situation.

When the detected forward object 200 is not present within the predicted travel region A100, the vehicle drive assist device 10 continues the normal travel control.

When it is determined that the detected forward object 200 is present within the predicted travel region A100, on the other hand, the vehicle drive assist device 10 determines whether a warning condition C_AT is met. The vehicle drive assist device 10 determines that the warning condition C_AT is met when a value (collision index value IC) that represents the possibility that the host vehicle 100 collides against the forward object 200 and that becomes smaller as the possibility that the host vehicle 100 collides against the forward object 200 becomes higher has become as small as a predetermined value (first index value IC1). In the present example, the vehicle drive assist device 10 acquires a predicted arrival time TTC as the collision index value IC, and determines that the warning condition C_AT is met when the predicted arrival time TTC has become as short as a predetermined time (first determination time TTC1).

The predicted arrival time TTC is a time predicted to be required for the host vehicle 100 to reach the forward object 200. The vehicle drive assist device 10 acquires the predicted arrival time TTC by dividing the object distance D200 by the relative speed ΔV200 (TTC=D200/ΔV200). Thus, the predicted arrival time TTC becomes shorter as the host vehicle 100 approaches the forward object 200 when the relative speed ΔV200 is constant.

The vehicle drive assist device 10 acquires the object distance D200 (distance between the forward object 200 and the host vehicle 100), the relative speed ΔV200, and the predicted arrival time TTC in predetermined computation cycles while it is determined that the forward object 200 is present within the predicted travel region A100, and determines whether the predicted arrival time TTC has become as short as the first determination time TTC1 each time the predicted arrival time TTC is acquired. The vehicle drive assist device 10 acquires the object distance D200 and the relative speed ΔV200 based on the peripheral detection information INF_S.

The vehicle drive assist device 10 executes the normal travel control when the predicted arrival time TTC is longer than the first determination time TTC1. The vehicle drive assist device 10 executes the normal travel control also before the deceleration control to be discussed later is started.

Figure 4A:
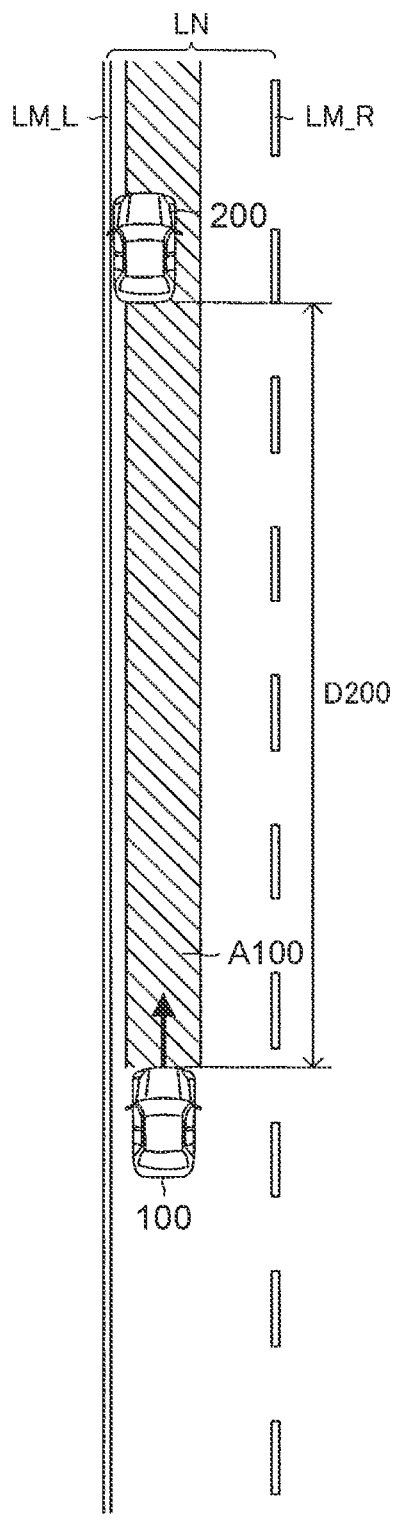
FIG. 4A illustrates a scene in which a warning condition is met with the host vehicle approaching the object (vehicle) that is present in the predicted travel region of the host vehicle.

The vehicle drive assist device 10 determines that the warning condition C_AT is met when the host vehicle 100 approaches the forward object 200 and the predicted arrival time TTC has become as short as the first determination time TTC1 as illustrated in FIG. 4A.

Warning Control

When it is determined that the warning condition C_AT is met, the vehicle drive assist device 10 starts the warning control, which is one of the collision avoidance control. In the warning control, the warning device 40 is caused to output a notification sound (or a warning sound) or a notification voice (or a warning voice), or the warning device 40 is caused to display a notification image (or a warning image).

The notification sound (or warning sound) output from the warning device 40 through the warning control reminds the driver DR that an object (forward object 200) is present ahead of the host vehicle 100, that there is a possibility that the host vehicle 100 collides against an object (forward object 200) ahead thereof, etc. The notification voice (or warning voice) output from the warning device 40 through the warning control is a voice indicating that an object (forward object 200) is present ahead of the host vehicle 100, a voice indicating that there is a possibility that the host vehicle 100 collides against an object (forward object 200) ahead thereof, a voice indicating a drive operation that is necessary to avoid a collision between the host vehicle 100 and an object (forward object 200) ahead thereof, etc.

The notification image (or warning image) displayed on the warning device 40 through the warning control is an image with characters, a figure, etc. indicating that an object (forward object 200) is present ahead of the host vehicle 100, an image with characters, a figure, etc. indicating that there is a possibility that the host vehicle 100 collides against an object (forward object 200) ahead thereof, an image using characters, a figure, etc. indicating a drive operation that is necessary to avoid a collision between the host vehicle 100 and an object (forward object 200) ahead thereof, etc.

Deceleration Control

After the warning condition C_AT is met, the vehicle drive assist device 10 determines whether a deceleration condition C_DE is met.

Deceleration Condition

The deceleration condition C_DE is met when an acceleration operation condition C2 is met when a predicted arrival time condition C1 is met. The deceleration condition C_DE is met also when a non-deceleration operation condition C3 is met when the predicted arrival time condition C1 is met.

In the present example, an object recognition condition C_OBJ that is met when the driver DR recognizes the presence of the forward object 200 is not met when the acceleration operation condition C2 is met, and the object recognition condition C_OBJ is not met also when the non-deceleration operation condition C3 is met.

Predicted Arrival Time Condition

The predicted arrival time condition C1 is met when the collision index value IC has become as small as a predetermined value (second index value IC2) that is smaller than the first index value IC1. In the present example, the predicted arrival time condition C1 is met when the predicted arrival time TTC has become as short as a predetermined time (second determination time TTC2) that is shorter than the first determination time TTC1.

The vehicle drive assist device 10 acquires the object distance D200, the relative speed ΔV200, and the predicted arrival time TTC in predetermined computation cycles also during execution of the warning control, and determines whether the predicted arrival time TTC has become as short as the second determination time TTC2 each time the predicted arrival time TTC is acquired.

Acceleration Operation Condition

The acceleration operation condition C2 is met when the brake pedal 53 is not operated and the accelerator pedal 51 is operated. That is, the acceleration operation condition C2 is met when a brake pedal non-operation condition C4 that is met when the brake pedal 53 is not operated is met and an accelerator pedal operation condition C5 that is met when the accelerator pedal 51 is operated is met.

When a warning is issued through the warning control and the driver DR recognizes the presence of the forward object 200 based on the warning, it is considered that the driver DR attempts to avoid a collision between the host vehicle 100 and the forward object 200 by decelerating the host vehicle 100 by operating the brake pedal 53. Thus, it is indicated that the driver DR does not recognize the presence of the forward object 200 when the driver DR is not operating the brake pedal 53 but is operating the accelerator pedal 51 even if a warning is issued through the warning control. Thus, it can be determined that the object recognition condition C_OBJ, which is met when the driver DR recognizes the presence of the forward object 200, is not met when the brake pedal non-operation condition C4 is met and the accelerator pedal operation condition C5 is met as discussed above.

The vehicle drive assist device 10 determines that the brake pedal 53 is not operated when the brake pedal operation amount BP is zero, and determines that the brake pedal 53 is operated when the brake pedal operation amount BP is more than zero. Likewise, the vehicle drive assist device 10 determines that the accelerator pedal 51 is not operated when the accelerator pedal operation amount AP is zero, and determines that the accelerator pedal 51 is operated when the accelerator pedal operation amount AP is more than zero.

Non-deceleration Operation Condition

The non-deceleration operation condition C3 is met when the accelerator pedal 51 is not operated, the brake pedal 53 is also not operated, and a state in which neither the accelerator pedal 51 nor the brake pedal 53 is operated is continued for a predetermined time (non-operation continuation time TNO). That is, the non-deceleration operation condition C3 is met when a brake non-operation condition C4 is met, the accelerator pedal operation condition C5 is not met, and a non-operation time condition C7 is met. The brake non-operation condition C4 is met when the brake pedal 53 is not operated. The accelerator pedal operation condition C5 is met when the accelerator pedal 51 is operated. The non-operation time condition C7 is met when a state in which neither the accelerator pedal 51 nor the brake pedal 53 is operated is continued for the non-operation continuation time TNO.

When the driver DR that is operating the accelerator pedal 51 recognizes the presence of the forward object 200 based on the warning issued through the warning control, the driver DR should stop an operation of the accelerator pedal 51 when the driver DR attempts to decelerate the host vehicle 100 by operating the brake pedal 53. Thus, while the driver DR stopping an operation of the accelerator pedal 51 after the warning control is started can be an evidence that the driver DR recognizes the forward object 200, there is a possibility that the driver DR does not recognize the forward object 200 if the driver DR does not operate the brake pedal 53 even when a certain time elapses after that.

Thus, it is indicated that the driver DR does not recognize the presence of the forward object 200 when the driver DR does not operate the accelerator pedal 51 and does not operate the brake pedal 53, either, and a state in which neither the accelerator pedal 51 nor the brake pedal 53 is operated is continued for a certain time or more after the warning control is started. Thus, it can be determined that the object recognition condition C_OBJ, which is met when the driver DR recognizes the presence of the forward object 200, is not met when the accelerator pedal operation condition C5 is not met, the brake pedal non-operation condition C4 is met, and the non-operation time condition C7 is met as discussed above.

When the deceleration condition C_DE is met, the vehicle drive assist device 10 starts the deceleration control, which is one of the collision avoidance control.

In the deceleration control, the host vehicle 100 is decelerated by reducing the drive force to be applied to the host vehicle 100, or the host vehicle 100 is decelerated by bringing the drive force to be applied to the host vehicle 100 to zero and applying a braking force to the host vehicle 100, irrespective of the accelerator pedal operation by the driver DR.

The degree of deceleration of the host vehicle 100 through the deceleration control is not controlled to such a degree of deceleration that stops the host vehicle 100 before the forward object 200, but is controlled to such a degree of deceleration that reminds the driver DR of the presence of the forward object 200 (i.e. that allows the driver DR to recognize the presence of the forward object 200). Thus, in the present example, deceleration of the host vehicle 100 through the deceleration control is used as a warning for the driver DR.

The vehicle drive assist device 10 continuously executes the warning control also during execution of the deceleration control.

Stop Control

Further, the vehicle drive assist device 10 determines whether the stop condition C_ST is met after the deceleration condition C_DE is met.

Stop Condition

The stop condition C_ST is met when the collision index value IC has become as small as a predetermined value (third index value IC3) that is smaller than the second index value IC2. In the present example, the stop condition C_ST is met when the predicted arrival time TTC has become as short as a predetermined time (third determination time TTC3) that is shorter than the second determination time TTC2.

Figure 4B:
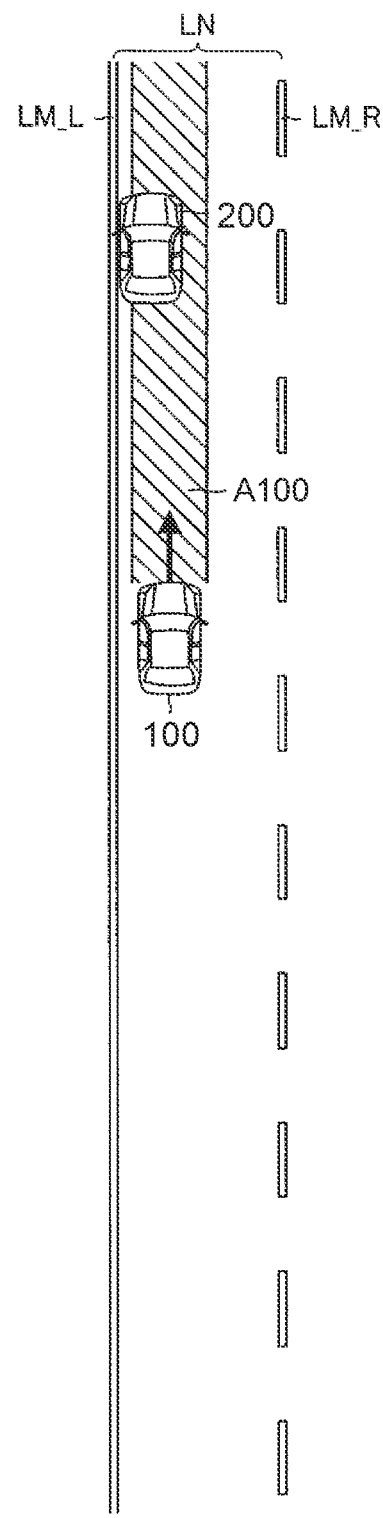
FIG. 4B illustrates a scene in which a stop condition is met with the host vehicle further approaching the object (vehicle) that is present in the predicted travel region of the host vehicle.

Thus, the vehicle drive assist device 10 determines that the stop condition C_ST is met when the host vehicle 100 approaches the forward object 200 and the predicted arrival time TTC becomes as short as the third determination time TTC3 while the driver DR does not perform a collision avoidance drive operation (a drive operation for avoiding a collision between the host vehicle 100 and the forward object 200) as illustrated in FIG. 4B.

When the stop condition C_ST is met, the vehicle drive assist device 10 starts the stop control, which is one of the collision avoidance control.

In the stop control, the host vehicle 100 is stopped before the forward object 200 by bringing the drive force to be applied to the host vehicle 100 to zero and forcibly applying a braking force to the host vehicle 100, irrespective of the accelerator pedal operation or the brake pedal operation by the driver DR.

When the stop control is started, the vehicle drive assist device 10 sets a degree of deceleration of the host vehicle 100 that is necessary to stop the host vehicle 100 before the forward object 200 as a target deceleration degree, and controls a braking force to be applied to the host vehicle 100 such that the host vehicle 100 decelerates with the target deceleration degree.

Figure 5A:
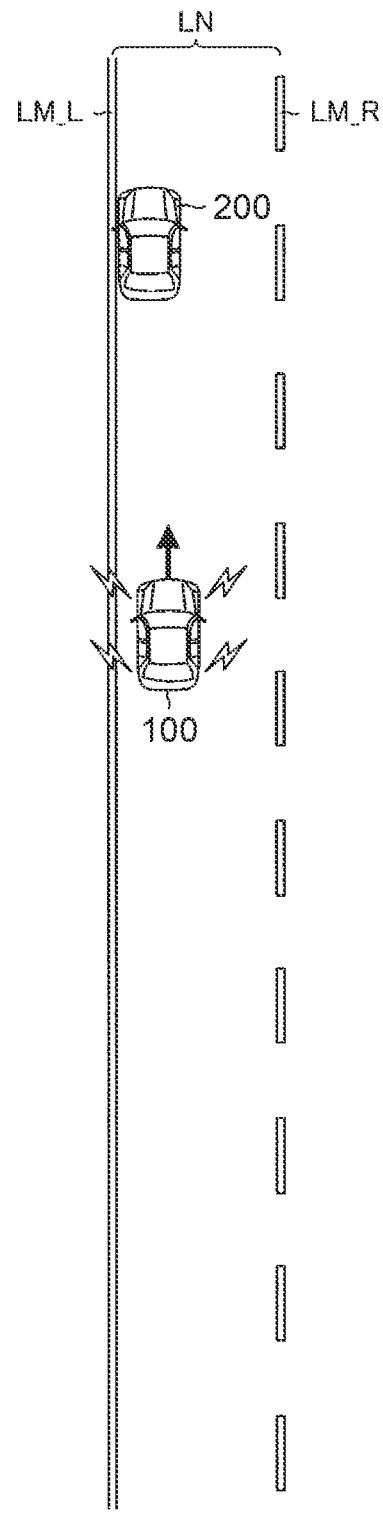
FIG. 5A illustrates a scene in which the stop control has been started.
Figure 5B:
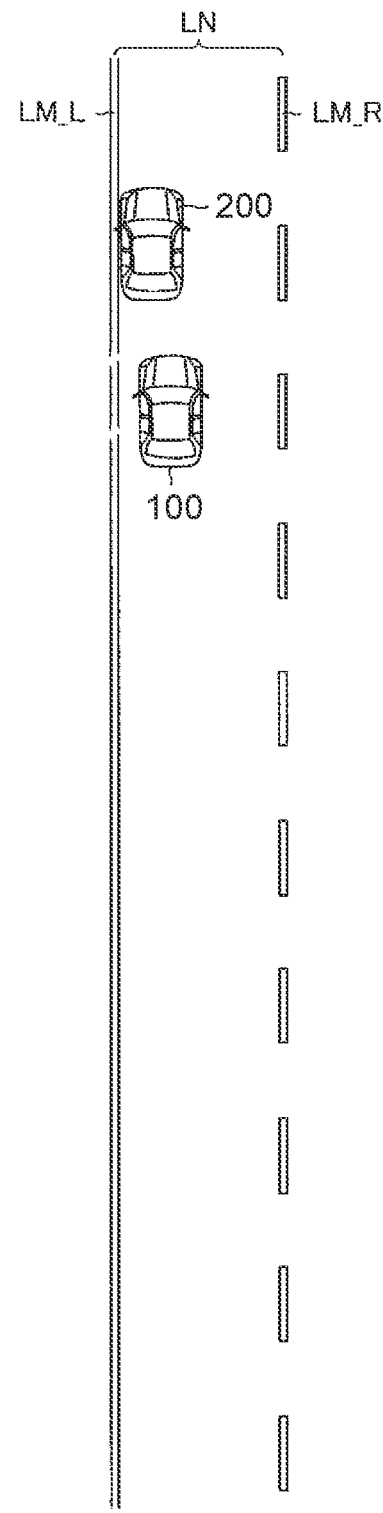
FIG. 5B illustrates a scene in which the host vehicle has been stopped through the stop control.

Consequently, the drive force to be applied to the host vehicle 100 is brought to zero and a braking force starts being applied to the host vehicle 100 as illustrated in FIG. 5A, and thereafter the host vehicle 100 is stopped before the forward object 200 as illustrated in FIG. 5B. Consequently, a collision between the host vehicle 100 and the forward object 200 is avoided.

While the vehicle drive assist device 10 continuously executes the warning control during execution of the stop control, the vehicle drive assist device 10 may be configured to stop the warning control when the stop control is started.

In some embodiments, the vehicle drive assist device 10 may be configured to execute the steering avoidance control along with the stop control, rather than executing the stop control alone, when it is determined to steer the host vehicle 100 so as to avoid the forward object 200 when the stop condition C_ST is met.

Figure 6:
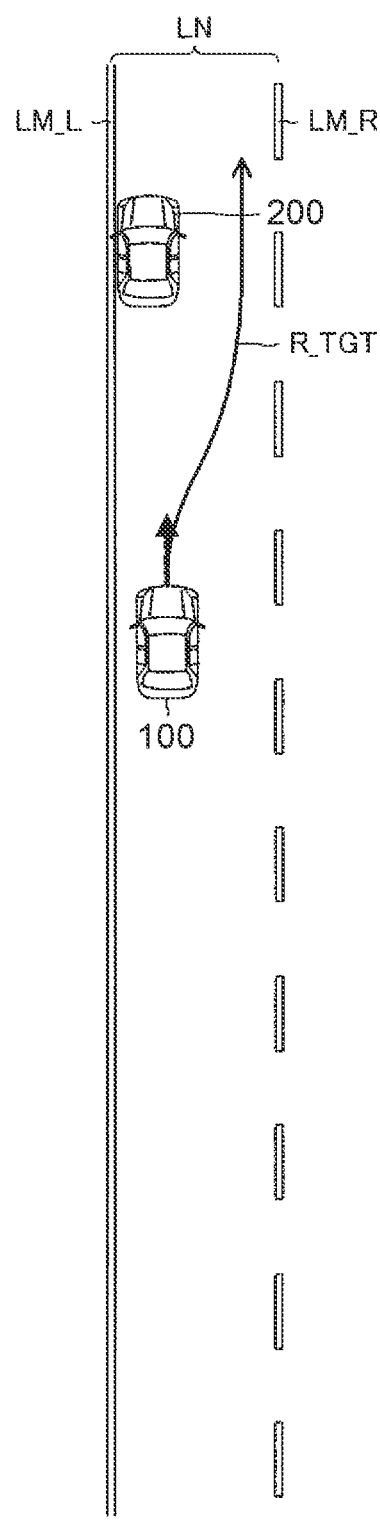
FIG. 6 illustrates a target avoidance path to be used in steering avoidance control.

In this case, the vehicle drive assist device 10 acquires a target avoidance path R_TGT based on the peripheral detection information INF_S when the stop condition C_ST is met. The target avoidance path R_TGT is a path along which the host vehicle 100 is caused to travel in order to avoid a collision between the host vehicle 100 and the forward object 200, and that allows the host vehicle 100 to pass by the forward object 200 while traveling within the host vehicle lane LN as illustrated in FIG. 6. While the target avoidance path R_TGT is a path that causes the host vehicle 100 to pass on the right side of the forward object 200 in the example illustrated in FIG. 6, a path that causes the host vehicle 100 to pass on the left side of the forward object 200 may be acquired as the target avoidance path R_TGT when a space that allows the host vehicle 100 to pass by the forward object 200 while traveling within the host vehicle lane LN is present on the left side of the forward object 200.

When the target avoidance path R_TGT is acquired, the vehicle drive assist device 10 starts steering avoidance control for controlling the steering force to be applied to the host vehicle 100 such that the host vehicle 100 travels along the target avoidance path R_TGT. The vehicle drive assist device 10 controls the steering force to be applied to the host vehicle 100 such that the host vehicle 100 travels along the target avoidance path R_TGT through the steering avoidance control.

Figure 7A:
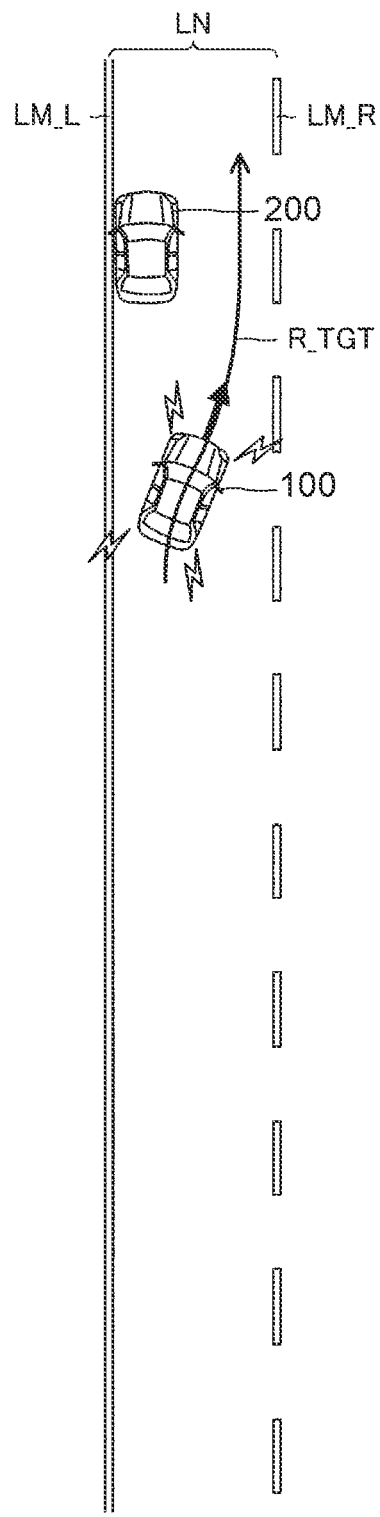
FIG. 7A illustrates a scene in which the stop control and the steering avoidance control have been started and the host vehicle has started turning along the target avoidance path through the steering avoidance control.
Figure 7B:
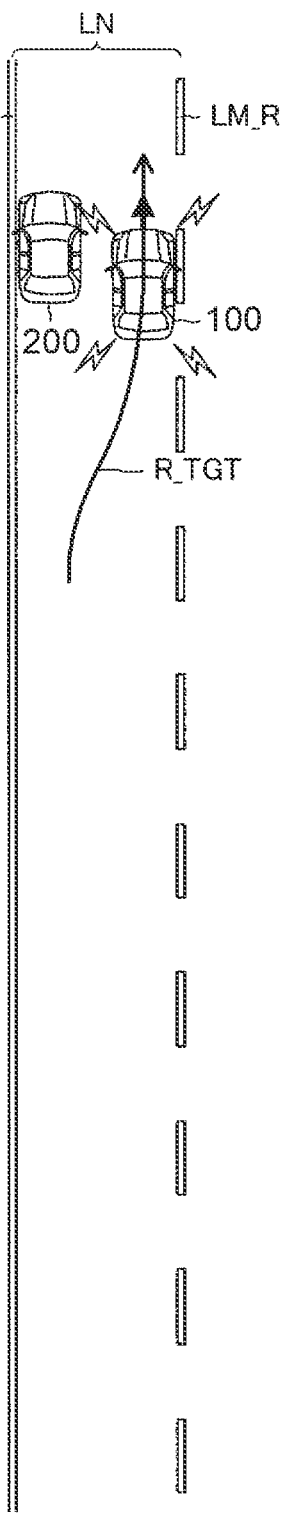
FIG. 7B illustrates a scene in which the host vehicle passes by the object (vehicle) that was ahead through the steering avoidance control.
Figure 7C:
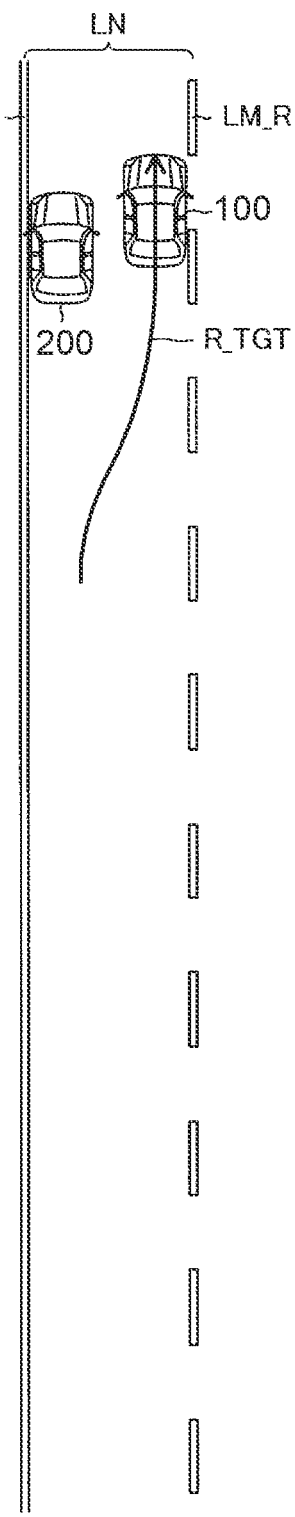
FIG. 7C illustrates a scene in which the host vehicle has been stopped at a side of the object (vehicle) that was ahead through the stop control.

Consequently, the host vehicle 100 first starts turning as illustrated in FIG. 7A, immediately thereafter turns in the opposite direction such that the travel direction of the host vehicle 100 becomes parallel to the host vehicle lane LN, and passes by the forward object 200 as illustrated in FIG. 7B. Consequently, a collision between the host vehicle 100 and the forward object 200 is avoided. The host vehicle 100 is decelerated as the stop control is also performed while the host vehicle 100 travels in this manner. Finally, the host vehicle 100 is stopped at a side of the forward object 200 as illustrated in FIG. 7C.

Stop Holding Control

When the host vehicle 100 is stopped through the stop control, the vehicle drive assist device 10 ends the stop control and the warning control, and starts stop holding control. In the stop holding control, the host vehicle 100 is held in a stopped state, and more specifically a braking force that is enough to hold the host vehicle 100 in a stopped state is continuously applied to the host vehicle 100 by an electric parking brake etc. When the vehicle drive assist device 10 is configured to execute the steering avoidance control along with the stop control, the vehicle drive assist device 10 ends the stop control and the steering avoidance control and starts the stop holding control when the host vehicle 100 is stopped through the stop control.

Effect

In some embodiments, a further warning such as the deceleration control may be provided to the driver DR when the driver DR is not reminded of the forward object 200 and, thus, the driver DR does not recognize the presence of the forward object 200 even when a warning is provided to the driver DR when there is a possibility that the host vehicle 100 collides against the forward object 200. In this case, it is conceivable to provide the host vehicle 100 with a camera that captures the face of the driver DR, for example, as a unit that determines whether the driver DR recognizes the presence of the forward object 200 and use an image of the driver DR captured by the camera. With such a configuration, however, the cost is increased since such a camera is mounted on the host vehicle 100, which is unfavorable.

When a warning is issued and the driver DR recognizes the presence of the forward object 200 based on the warning, on the other hand, the driver DR should attempt to avoid a collision between the forward object 200 and the host vehicle 100. If the driver DR attempts to avoid a collision between the forward object 200 and the host vehicle 100, it is considered that the driver DR operates the brake pedal 53, or stops an operation of the accelerator pedal 51 in order to operate the brake pedal 53. Thus, it can be determined whether the driver DR recognizes the presence of the forward object 200 based on the operation states of the brake pedal 53 and the accelerator pedal 51 after a warning is started.

The vehicle drive assist device 10 determines whether the driver DR recognizes the presence of the forward object 200 (i.e. whether the object recognition condition C_OBJ is met) based on the states of operations of the brake pedal 53 and the accelerator pedal 51 by the driver DR. The vehicle drive assist device 10 executes the deceleration control when it is determined that the object recognition condition C_OBJ is not met when the collision index value IC has become as small as the second index value IC2, and does not execute the deceleration control when it is determined that the object recognition condition C_OBJ is met even when the collision index value IC has become as small as the second index value IC2. Thus, the vehicle drive assist device 10 can appropriately determine whether it is necessary to execute the deceleration control without requiring a camera that captures the face of the driver DR.

The present disclosure is not limited to the embodiment described above, and a variety of modifications can be adopted within the scope of the present disclosure.

First Modification

When a warning is issued through the warning control and the driver DR recognizes the presence of the forward object 200 based on the warning and attempts to avoid a collision between the forward object 200 and the host vehicle 100, for example, it is considered that the driver DR attempts to decelerate the host vehicle 100 by increasing the gear ratio of the host vehicle 100 by operating the shift lever 61.

Thus, it can be determined that the driver DR recognizes the presence of the forward object 200 based on the fact that the driver DR has performed an operation (gear ratio increase operation) to increase the gear ratio of the host vehicle 100 after the warning control is started. Conversely, it can be determined that the driver DR does not recognize the presence of the forward object 200 based on the fact that the driver DR has not performed a gear ratio increase operation after the warning control is started.

Thus, the vehicle drive assist device 10 may be configured to determine that the deceleration condition C_DE is not met when a gear ratio increase operation condition C8 is met even when the predicted arrival time condition C1 is met, the gear ratio increase operation condition C8 being met when a gear ratio increase operation such as an operation of the shift lever 61 to increase the gear ratio is performed. That is, the vehicle drive assist device 10 may be configured to determine that the object recognition condition C_OBJ is met when the gear ratio increase operation condition C8 is met.

In this case, the vehicle drive assist device 10 is configured to determine that the deceleration condition C_DE is met when the gear ratio increase operation condition C8 is not met when the predicted arrival time condition C1 is met. That is, the vehicle drive assist device 10 is configured to determine that the object recognition condition C_OBJ is not met when the gear ratio increase operation condition C8 is not met.

With this configuration, it is possible to appropriately determine whether it is necessary to execute the deceleration control without requiring a camera that captures the face of the driver DR.

Second Modification

When a warning is issued through the warning control and the driver DR recognizes the presence of the forward object 200 based on the warning, it is considered that the driver DR attempts to avoid a collision between the host vehicle 100 and the forward object 200 by changing the course of the host vehicle 100 by operating the blinker lever 63 or the steering wheel 55.

Thus, it can be determined that the driver DR recognizes the presence of the forward object 200 based on the fact that the driver DR has performed an operation (course change operation) to change the course of the host vehicle 100 after the warning control is started. Conversely, it can be determined that the driver DR does not recognize the presence of the forward object 200 based on the fact that the driver DR has not performed a course change operation after the warning control is started.

Thus, the vehicle drive assist device 10 may be configured to determine that the deceleration condition C_DE is not met when a course change operation condition C9 is met even when the predicted arrival time condition C1 is met, the course change operation condition C9 being met when at least one course change operation, such as an operation of the blinker lever 63, an operation to rotate the steering wheel 55 by a predetermined angle θ_TH or more, and an operation to rotate the steering wheel 55 at a predetermined angular speed Δθ_TH or more, is performed. That is, the vehicle drive assist device 10 may be configured to determine that the object recognition condition C_OBJ is met when the course change operation condition C9 is met.

In this case, the vehicle drive assist device 10 is configured to determine that the deceleration condition C_DE is met when the course change operation condition C9 is not met when the predicted arrival time condition C1 is met. That is, the vehicle drive assist device 10 is configured to determine that the object recognition condition C_OBJ is not met when the course change operation condition C9 is not met.

With this configuration, it is possible to appropriately determine whether it is necessary to execute the deceleration control without requiring a camera that captures the face of the driver DR.

To determine whether the deceleration condition C_DE is met, the vehicle drive assist device 10 may be configured to use only one of the acceleration operation condition C2, the non-deceleration operation condition C3, the gear ratio increase operation condition C8, and the course change operation condition C9 discussed above, or may be configured to use any two or more of such conditions.

Specific Operation of Vehicle Drive Assist Device

Next, specific operation of the vehicle drive assist device 10 will be described. The CPU of the ECU 90 of the vehicle drive assist device 10 according to the embodiment of the present disclosure executes the routine illustrated in FIG. 8 in predetermined computation cycles. Thus, when a predetermined timing comes, the CPU starts the process in step 800 in FIG. 8, proceeds to step 805, and determines whether the warning condition C_AT is met.

When the CPU determines "Yes" in step 805, the CPU proceeds to step 810, and executes the warning control. Then, the CPU proceeds to step 815, and determines whether execution of the stop control is disabled.

Figure 9:
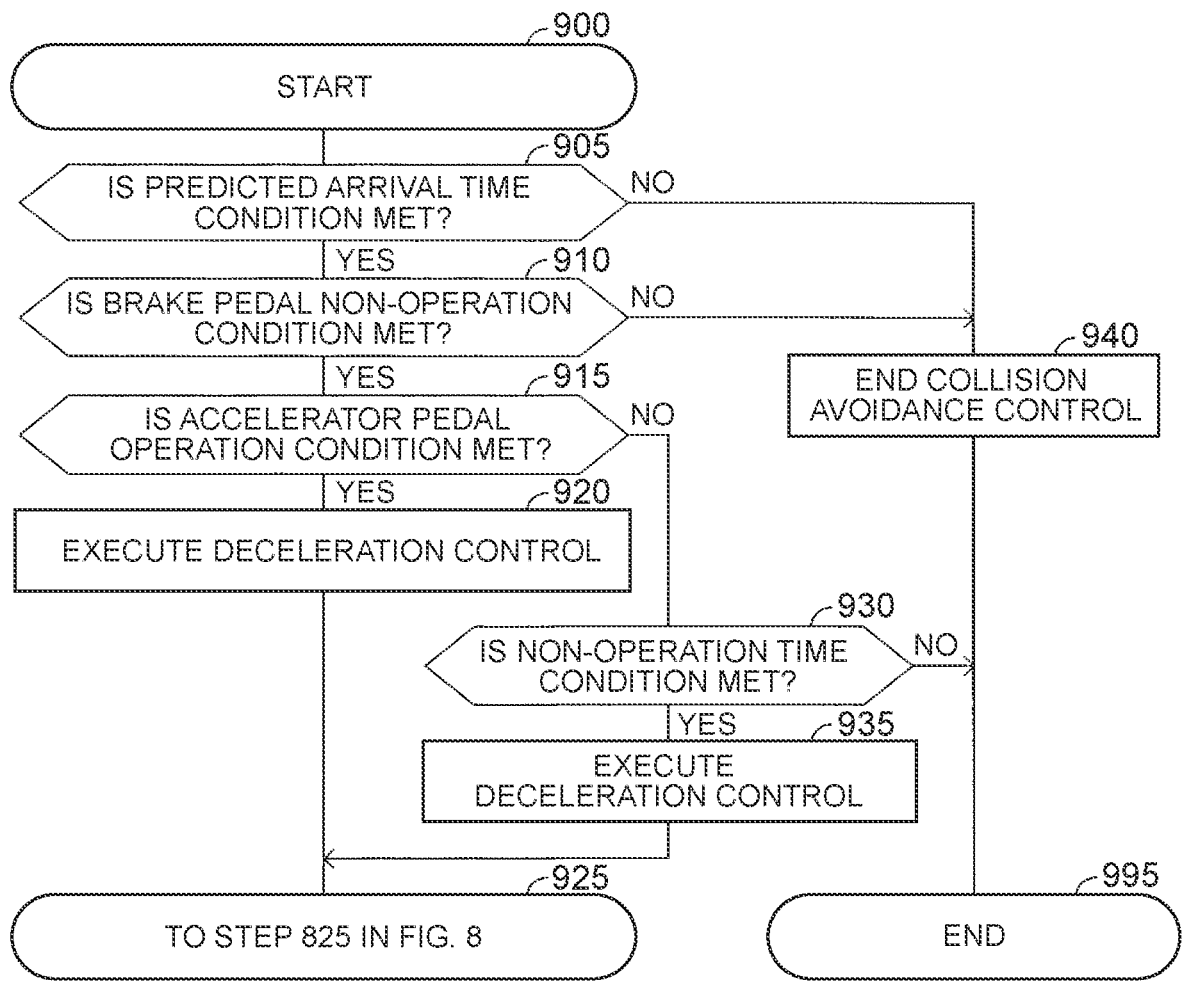
FIG. 9 is a flowchart illustrating a routine executed by the vehicle drive assist device according to the embodiment of the present disclosure.
Figure 10:
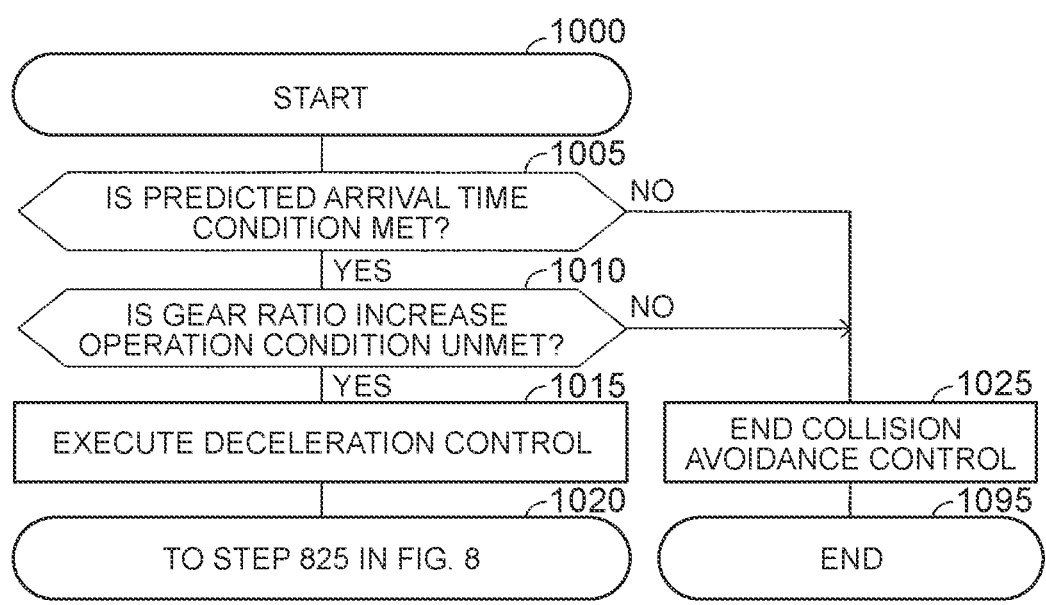
FIG. 10 is a flowchart illustrating a routine executed by the vehicle drive assist device according to the embodiment of the present disclosure.
Figure 11:
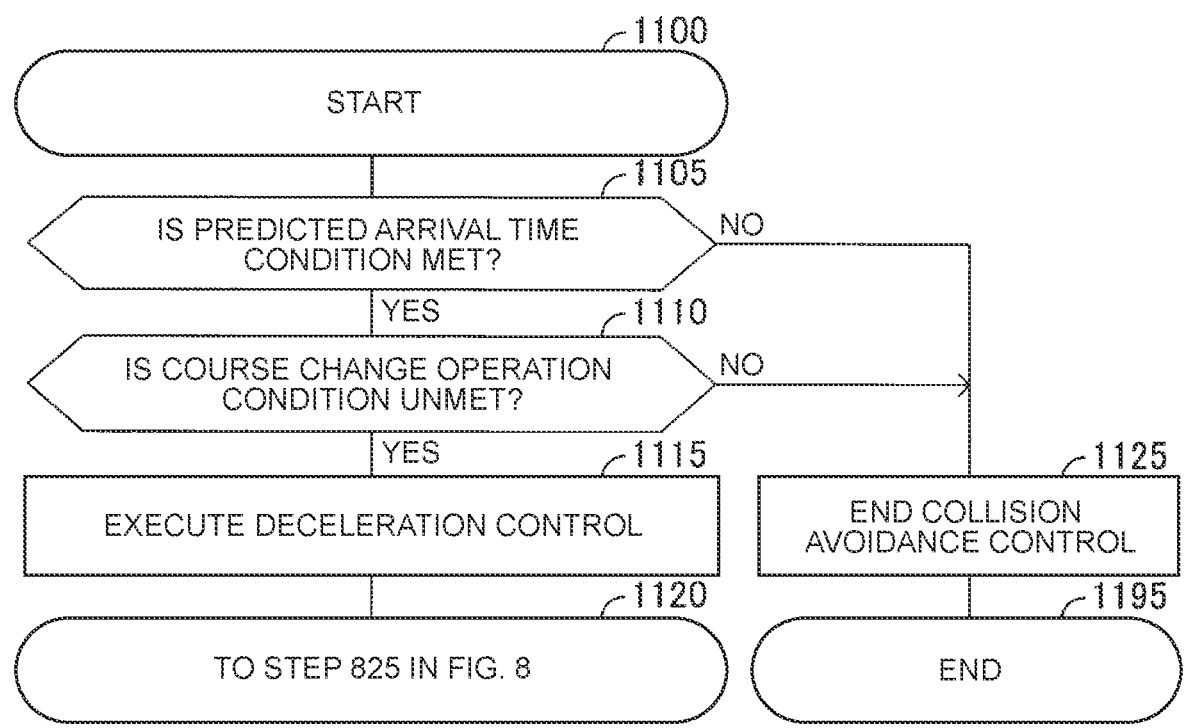
FIG. 11 is a flowchart illustrating a routine executed by the vehicle drive assist device according to the embodiment of the present disclosure.

When the CPU determines "Yes" in step 815, the CPU proceeds to step 820, and executes one of the routines illustrated in FIGS. 9 to 11. However, the CPU may be configured to execute two or all of the routines illustrated in FIGS. 9 to 11.

When the CPU determines "No" in step 815, on the other hand, the CPU directly proceeds to step 825.

When the routine illustrated in FIG. 9 is to be executed, the CPU starts the process in step 900 in FIG. 9 after proceeding to step 820, proceeds to step 905, and determines whether the predicted arrival time condition C1 is met.

When the CPU determines "Yes" in step 905, the CPU proceeds to step 910, and determines whether the brake pedal non-operation condition C4 is met.

When the CPU determines "Yes" in step 910, the CPU proceeds to step 915, and determines whether the accelerator pedal operation condition C5 is met.

When the CPU determines "Yes" in step 915, the CPU proceeds to step 920, and executes the deceleration control. Then, the CPU proceeds to step 825 in FIG. 8 by way of step 925.

When the CPU determines "No" in step 915, on the other hand, the CPU proceeds to step 930, and determines whether the non-operation time condition C7 is met.

When the CPU determines "Yes" in step 930, the CPU proceeds to step 935, and executes the deceleration control. Then, the CPU proceeds to step 825 in FIG. 8 by way of step 925.

When the CPU determines "No" in step 930, on the other hand, the CPU directly proceeds to step 995, and temporarily ends the present routine.

When the CPU determines "No" in step 905 or step 910, meanwhile, the CPU proceeds to step 940, and ends the collision avoidance control.

Then, the CPU proceeds to step 995, and temporarily ends the present routine.

When the routine illustrated in FIG. 10 is to be executed, meanwhile, the CPU starts the process in step 1000 in FIG. 10 after proceeding to step 820, proceeds to step 1005, and determines whether the predicted arrival time condition C1 is met.

When the CPU determines "Yes" in step 1005, the CPU proceeds to step 1010, and determines whether the gear ratio increase operation condition C8 is unmet.

When the CPU determines "Yes" in step 1010, the CPU proceeds to step 1015, and executes the deceleration control. Then, the CPU proceeds to step 825 in FIG. 8 by way of step 1020.

When the CPU determines "No" in step 1010, on the other hand, the CPU proceeds to step 1025, and ends the collision avoidance control. Then, the CPU proceeds to step 1095, and temporarily ends the present routine.

Also when the CPU determines "No" in step 1005, the CPU proceeds to step 1025, and ends the collision avoidance control. Then, the CPU proceeds to step 1095, and temporarily ends the present routine.

When the routine illustrated in FIG. 11 is to be executed, meanwhile, the CPU starts the process in step 1100 in FIG. 11 after proceeding to step 820, proceeds to step 1105, and determines whether the predicted arrival time condition C1 is met.

When the CPU determines "Yes" in step 1105, the CPU proceeds to step 1110, and determines whether the course change operation condition C9 is unmet.

When the CPU determines "Yes" in step 1110, the CPU proceeds to step 1115, and executes the deceleration control. Then, the CPU proceeds to step 825 in FIG. 8 by way of step 1120.

When the CPU determines "No" in step 1110, on the other hand, the CPU proceeds to step 1125, and ends the collision avoidance control. Then, the CPU proceeds to step 1195, and temporarily ends the present routine.

Also when the CPU determines "No" in step 1105, the CPU proceeds to step 1125, and ends the collision avoidance control. Then, the CPU proceeds to step 1195, and temporarily ends the present routine.

Figure 8:
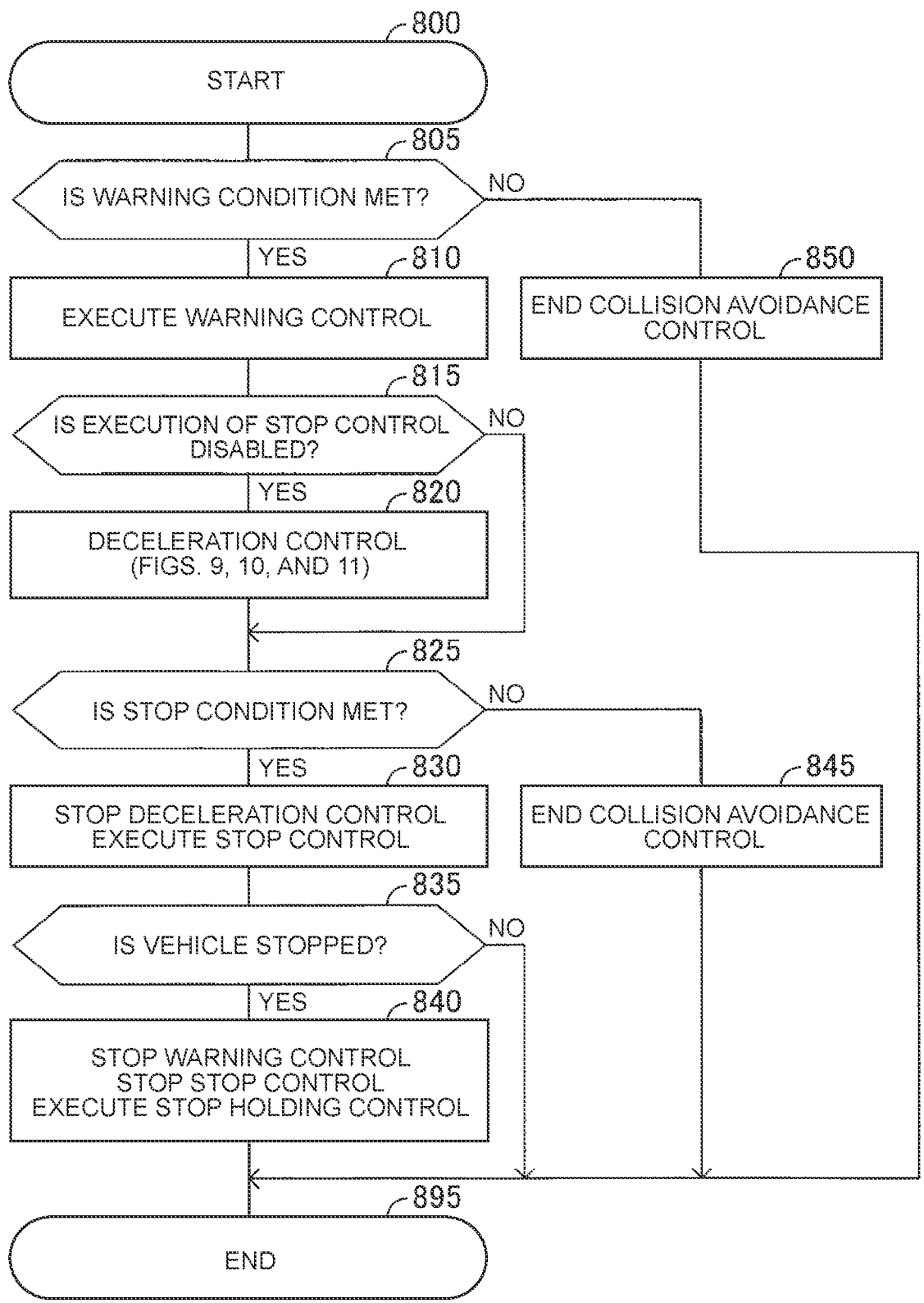
FIG. 8 is a flowchart illustrating a routine executed by the vehicle drive assist device according to the embodiment of the present disclosure.

When the CPU proceeds to step 825 in FIG. 8, the CPU determines whether the stop condition C_ST is met.

When the CPU determines "Yes" in step 825, the CPU proceeds to step 830, and stops the deceleration control and executes the stop control. Then, the CPU proceeds to step 835, and determines whether the host vehicle 100 is stopped.

When the CPU determines "Yes" in step 835, the CPU proceeds to step 840, and stops the warning control and the stop control and executes the stop holding control. Then, the CPU proceeds to step 895, and temporarily ends the present routine.

When the CPU determines "No" in step 835, on the other hand, the CPU directly proceeds to step 895, and temporarily ends the present routine.

When the CPU determines "No" in step 825, meanwhile, the CPU proceeds to step 845, and ends the collision avoidance control. Then, the CPU proceeds to step 895, and temporarily ends the present routine.

When the CPU determines "No" in step 805, meanwhile, the CPU proceeds to step 850, and ends the collision avoidance control. Then, the CPU proceeds to step 895, and temporarily ends the present routine.

The above is the specific operation of the vehicle drive assist device 10.

What is claimed is:

1. A vehicle drive assist device comprising an electronic control unit configured to:
    set a collision index value that becomes smaller as a possibility that a host vehicle collides against an object ahead of the host vehicle becomes higher;
    determine whether an object recognition condition meets a predetermined condition based on a state of an operation of an operator of the host vehicle by a driver of the host vehicle, the predetermined condition meaning that the driver recognizes presence of the object;

execute warning control for warning the driver when the collision index value is smaller than a first index value;

execute deceleration control for decelerating the host vehicle when the collision index value is smaller than a second index value that is smaller than the first index value and the electronic control unit determines that the object recognition condition does not meet the predetermined condition;

disable execution of the deceleration control when the collision index value is smaller than the second index value and the electronic control unit determines that the object recognition condition meets the predetermined condition;

determine whether the object recognition condition meets the predetermined condition based on a state of an operation of an accelerator operator of the host vehicle and a state of an operation of a brake operator of the host vehicle; and determine that the object recognition condition does not meet the predetermined condition when the brake operator is not operated and the accelerator operator is operated.

2. The vehicle drive assist device according to claim 1, wherein the electronic control unit is configured to determine that the object recognition condition does not meet the predetermined condition when the accelerator operator is not operated continuously for a predetermined time and the brake operator is not operated.

3. The vehicle drive assist device according to claim 1, wherein the electronic control unit is configured to:
determine that the object recognition condition meets the predetermined condition when an operator of the host vehicle is operated to increase a gear ratio of the host vehicle; and
determine that the object recognition condition does not meet the predetermined condition when the operator of the host vehicle is not operated to increase the gear ratio of the host vehicle.

4. The vehicle drive assist device according to claim 1, wherein the electronic control unit is configured to:
determine that the object recognition condition meets the predetermined condition when an operator of the host vehicle is operated to change a course of the host vehicle; and
determine that the object recognition condition does not meet the predetermined condition when the operator of the host vehicle is not operated to change the course of the host vehicle.

5. The vehicle drive assist device according to claim 1, wherein the electronic control unit is configured to execute stop control for stopping the host vehicle when the collision index value is smaller than a third index value that is smaller than the second index value after the deceleration control is started.

6. A non-transitory storage medium storing instructions that are executable by one or more electronic control units and that cause the one or more electronic control units to execute functions comprising:
setting a collision index value that becomes smaller as a possibility that a host vehicle collides against an object ahead of the host vehicle becomes higher;
determining whether an object recognition condition meets a predetermined condition based on a state of an operation of an operator of the host vehicle by a driver of the host vehicle, the predetermined condition meaning that the driver recognizes presence of the object;
executing warning control for warning the driver when the collision index value is smaller than a first index value;
executing deceleration control for decelerating the host vehicle when the collision index value is smaller than a second index value that is smaller than the first index value and it is determined that the object recognition condition does not meet the predetermined condition;
disabling execution of the deceleration control when the collision index value is smaller than the second index value and it is determined that the object recognition condition meets the predetermined condition;
determining whether the object recognition condition meets the predetermined condition based on a state of an operation of an accelerator operator of the host vehicle and a state of an operation of a brake operator of the host vehicle; and
determining that the object recognition condition does not meet the predetermined condition when the brake operator is not operated and the accelerator operator is operated.

7. The non-transitory storage medium according to claim 6, wherein it is determined that the object recognition condition does not meet the predetermined condition when the accelerator operator is not operated continuously for a predetermined time and the brake operator is not operated.

8. A vehicle drive assist method comprising:
setting a collision index value that becomes smaller as a possibility that a host vehicle collides against an object ahead of the host vehicle becomes higher;
determining whether an object recognition condition meets a predetermined condition based on a state of an operation of an operator of the host vehicle by a driver of the host vehicle, the predetermined condition meaning that the driver recognizes presence of the object;
executing warning control for warning the driver when the collision index value is smaller than a first index value;
executing deceleration control for decelerating the host vehicle when the collision index value is smaller than a second index value that is smaller than the first index value and it is determined that the object recognition condition does not meet the predetermined condition;
disabling execution of the deceleration control when the collision index value is smaller than the second index value and it is determined that the object recognition condition meets the predetermined condition;
determining whether the object recognition condition meets the predetermined condition based on a state of an operation of an accelerator operator of the host vehicle and a state of an operation of a brake operator of the host vehicle; and
determining that the object recognition condition does not meet the predetermined condition when the brake operator is not operated and the accelerator operator is operated.

* * * * *